United States Patent
Sim et al.

(10) Patent No.: US 8,266,638 B2
(45) Date of Patent: Sep. 11, 2012

(54) COMPOSITE SERVICE CONTROL SYSTEM USING EXPLICIT AND IMPLICIT CONFLICT RESOLUTION SCHEME

(75) Inventors: Jaecheol Sim, Daejeon (KR); Kee Seong Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 348 days.

(21) Appl. No.: 12/639,209

(22) Filed: Dec. 16, 2009

(65) Prior Publication Data
US 2010/0162276 A1   Jun. 24, 2010

(30) Foreign Application Priority Data
Dec. 22, 2008  (KR) .......................... 10-2008-0131433

(51) Int. Cl.
*G06F 3/00* (2006.01)

(52) U.S. Cl. ........................................................ 719/328

(58) Field of Classification Search .................. 719/328
See application file for complete search history.

(56) References Cited

U.S. PATENT DOCUMENTS

| | | | |
|---|---|---|---|
| 2005/0177632 A1* | 8/2005 | Yach et al. | 709/224 |
| 2006/0031681 A1* | 2/2006 | Smith et al. | 713/182 |
| 2007/0027925 A1* | 2/2007 | Spencer et al. | 707/104.1 |

OTHER PUBLICATIONS

Susanne Boll, A Java Application Programming Interface to a Multimedia Enhanced Object-Oriented DBMS, Sep. 16, 1996.*

* cited by examiner

*Primary Examiner* — Lechi Truong
(74) *Attorney, Agent, or Firm* — Nelson Mullins Riley & Scarborough LLP; EuiHoon Lee, Esq.

(57) ABSTRACT

Disclosed is a composite service control system resolving a conflict. A triggering condition of a new application that requests a registration is determined. When the determined triggering condition overlaps with a triggering condition of an existing registered application, determinations are made whether an intersection between an explicit conflict set of the new application and an explicit conflict set of the existing application exists and whether an intersection between an implicit conflict set of an API of the new application and an implicit conflict set of an API of the existing application exists; and
The triggering condition and execution information of the existing application is reported. When either of the intersections exists, a defining of a conflict resolution policy or a changed application triggering condition for the new application is requested; otherwise the triggering condition and the execution information of the new application is stored in an information database.

7 Claims, 7 Drawing Sheets

```
<Name>X</Name>
<ExecutionPath>
    <Sequential>
        <Call>A</Call>
        <Conditional>
                <Call>B</Call>
                <Call>C</Call>
        <Conditional>
        <Fork>
                <Call>D</Call>
                <Call>E</Call>
        </Fork>
        <Loop>
                <Sequence>
                        <Call>D</Call>
                        <Call>E</Call>
                </Sequence>
        </Loop>
    </Sequential>
    <ExecutionPath>
</API>
```

COMPOSITE SERVICE CONTROL SYSTEM USING EXPLICIT AND IMPLICIT CONFLICT RESOLUTION SCHEME

CROSS-REFERENCE TO RELATED APPLICATION

This application claims the benefit of Korean Patent Application No. 10-2008-0131433, filed on Dec. 22, 2008, in the Korean Intellectual Property Office, the disclosure of which is incorporated herein by reference.

BACKGROUND

1. Field of the Invention

The present invention relates to a composite service control system that predicts and resolves a conflict between applications that independently developed and operated. The system classifies a conflict as an explicit conflict that occurs inevitably when the applications are executed, and an implicit conflict that occurs conditionally depending on the execution flow of the applications. And when a new application is developed and registered to be deployed to the system, the system predicts a conflict based on the implicit conflict and the explicit conflict and reports a conflict to establish conflict resolution policies. When the applications are in service, the system detects and resolves the predicted conflict using the established conflict resolution policies.

2. Description of the Related Art

Development of information and communication technologies enables various supplementary services in addition to primary services such as a voice call service, and a short message service on a communication network. A number of the supplementary services gradually increases and the supplementary services implements various business logic, and thus, it is important to operate the service without a conflict between the services.

Particularly, various supplementary services dynamically using a profile, a presence, a multimedia, and the like are provided in an Internet Protocol (IP) network environment, and a concept of a composite service that provides a new enhanced service by combining existing services is introduced. It is important for the composite service to promptly develop and introduce a new service compared with a conventional voice service environment where a relatively limited number of supplementary services are provided.

However, development and deployment of the composite service have two major difficulties.

One difficulty relates to how to easily and promptly develop and provide the new service.

For this, the composite service introduces a technology that provides an application programming interface (API) as a web interface, the API being required for abstracting a function of a network, such as a parlay-X, and controlling a service.

Another difficulty relates to how to prevent the conflict between services, since there may be services pursuing inconsistent objectives or competing for an identical network resource when various services exist. For this, ITU-T defines a 'service capability interaction manager' function to prevent the conflict between services. However, only the logical function is defined and a method of embodying the function is not provided.

It has been well known that the conflict between the services may occur when various supplementary services exist in a communication network, and this is referred to as a 'feature interaction' problem. A representative example is a situation where 'call forwarding and a call waiting' exist together. This situation may be a problem when a user simultaneously uses both services, that is, when a new call is received while the user still on the phone. In this instance, an call exchange system may not determine whether to perform a call forwarding service that redirect the call to an predetermined phone number or to perform a call waiting service that enables the user to come and go between the ongoing call and the new call by pressing a hook flash. The conflict may be caused by incompatibleness of the objectives of the services triggered at an identical precondition or competition to use an identical resource.

In addition, the composite service that configures the new service by combining existing services may have a high possibility of conflict since the services comprising the composite service interact with each other, and may have difficulty in predicting the conflict in advance to resolve the conflict.

Conventionally, a concept of a service broker has been used for controlling an interaction of the composite service in a voice communication network. A service broker scheme monitors various events such as a message generated in a network and distributes the events to an appropriate application, thereby embodying the composite service. According to the service broker scheme, when the composite service is embodied by using the existing application, a developer of the composite service may make a composite service logic processing each event and may load the composite service logic to the service broker. In this instance, the service logic contained in the service broker is required to solve a possible conflict due to a new composition, by the service logic alone. Also, since all the composite service logic is contained and executed in the service broker, the service broker may centrally control execution of all the composite application.

As described above, in the service broker scheme, a composite application writer may require detailed information with respect to operations of all services, and may be required to embody an exact service logic that prevents or processes a conflict based on the detailed information. In general, it is significantly difficult to obtain and analyze the information, and also many tests and many trials and errors are required to determine that an added service does not cause a conflict. Also, since the composite service logic is executed in the service broker, there is a problem in that the service broker may have a performance burden. Accordingly, the present invention proposes a new technology that uses a concept of the composite service and predicts a conflict between applications to prevent the conflict between the applications in advance.

SUMMARY

An aspect of the present invention provides a composite service control system that may resolve a conflict between an existing application and a new application by predicting the conflict between the existing application and the new application, changing an application triggering condition of the new application, and comparing an explicit conflict set/an implicit conflict set between the existing application and the new application, when the application triggering condition of the new application is the same with an application triggering condition of the existing application.

Another aspect of the present invention also provides a composite service control system that may determine one of a mutual exclusion, a sequence preservation, and a cancel possibility as a conflict condition for each application programming interface (API) called from an application, may define an explicit conflict set and an implicit conflict set for an API that satisfies the conflict condition, and thereby may process a conflict between applications based on the explicit conflict set and the implicit conflict set when the API are called from a plurality of applications.

Another aspect of the present invention also provides a composite service control system that may resolve a conflict between applications according to explicit conflict resolution scheme that resolves the conflict between the plurality of applications, when the plurality of applications call an API that necessarily cause the conflict.

Another aspect of the present invention also provides a composite service control system that may resolves a conflict between a plurality of applications during an execution of each application based on implicit conflict resolution scheme that resolves the conflict between the plurality of applications, when an API that cause a conflict is determined to be called according to an execution path of each application.

According to an aspect of the present invention, there is provided a composite service control system resolving a conflict, the system including a conflict set defining unit to classify and define an explicit conflict set and an implicit conflict set with respect to an API that is called from each application, a determining unit to determine an application triggering condition of a new application that requests a registration, and, when the determined application triggering condition is the same with an application triggering condition of an existing registered application, to determine whether an intersection between an explicit conflict set with respect to an API of the new application and an explicit conflict set with respect to an API of the existing application exists and whether an intersection between an implicit conflict set with respect to an API of the new application and an implicit conflict set with respect to an API of the existing application exists, an application managing unit to receive the application triggering condition and execution path information of the new application and to request to define a conflict resolution policy or to change application triggering condition to the new application, when the intersections exist, and to store the application triggering condition and the execution path information of the new application in an application information database, when the intersections do not exist or the conflict resolution policy has been defined, an explicit conflict processing unit to select an application to be executed from among the explicit conflict set according to the application triggering condition and the conflict resolution policy of each application which are stored in the application information database, and an implicit conflict processing unit to determine whether to execute or cancel an API in the implicit conflict set according to a conflict resolution policy when the API is called.

Additional aspects, features, and/or advantages of the invention will be set forth in part in the description which follows and, in part, will be apparent from the description, or may be learned by practice of the invention.

EFFECT

According to a present invention, a composite service control system may resolve a conflict between an existing application and a new application by predicting the conflict between the existing application and the new application, changing an application triggering condition of the new application, and establishing conflict resolution scheme for an existing application or the new application.

According to a present invention, a composite service control system may resolve a conflict between applications according to an explicit conflict resolution scheme that resolves the conflict between the plurality of applications, when the plurality of applications call an API that necessarily cause the conflict.

According to a present invention, a composite service control system may resolves a conflict between a plurality of applications during an execution of each application based on an implicit conflict resolution scheme that resolves the conflict between the plurality of applications, when an API is determined to be called according to an execution route of each application, even though the plurality of applications simultaneously call an API cause a mutual conflict.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

In the present invention, a resource provided from an infrastructure network is identified and abstracted by using a web service interface, thereby enabling an application to control the resource and monitor a change of a status. As an example, in a case of a VoD service provided in a communication network, each function of connection setup and release for a movie, play, pause, stop, and the like are defined as an application programming interface (API), and the application may control the VoD service by calling the APIs through the web service interface. An example embodiment of a definition and an operation of the API may be found out from a standard such as a Parlay-X standard which are a communication network control technology standards using a web service technology. The standards define an API to control the resource for each resource, define a status of the resource, and define an API to enable the application to receive a report for a change of the status of the resource. Also, the application defines an API to enable another application to use service embodied by the application.

Figure 1:
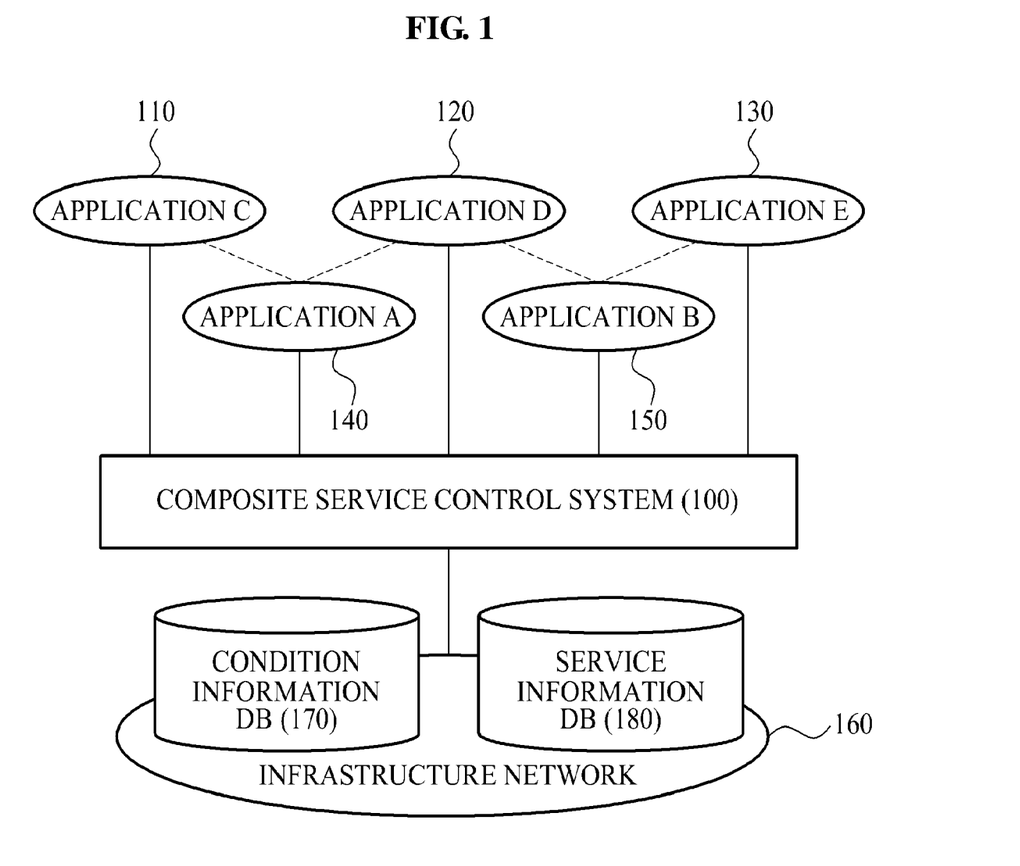
FIG. 1 is a diagram illustrating an operational environment of a composite service control system according to an embodiment of the present invention.

FIG. 1 is a diagram illustrating an operational environment of a composite service control system according to an embodiment of the present invention.

As illustrated in FIG. 1, the composite service control system 100 may be connected with an infrastructure network 160 such as a voice communication network to provide a service, and may connect the infrastructure network 160 with various applications 110 through 150 that use a capability provided by the infrastructure network 160. Each of applications 110 through 150 is initiated by the composite service control system 100 and uses an ability of the infrastructure network 160 by calling an API provided by the composite service control system 100.

A composite service is a service that provides a new service by using an existing service, the composite service is initiated by the composite service control system 100 but the ability of the infrastructure network may be actually requested by a primitive application used by the composite service. Each of applications A 140, and B 150 is a application as is, and is capable of using the ability of the infrastructure network 160 by calling an API provided by application C, D, and E. An application A 140 is a composite application calling APIs of the application C 110 and the application D 120, and an application B 150 is a composite application calling an API of the application D 120 and the application E 130.

The application service control system 100 may use a status information DB 170 that stores status information of a service and the infrastructure network and also may use a service information database 180 that stores service information for each user.

Although each of the application A 140 and the application B 150 which are the composite application is a single application, each application is implemented to use functionality of another application, such as the application C 110, the application D 120, and the application E 130. Accordingly, the application A 140 and the application B 150 may embody their unique functions that the applications C, D, and E do not process or may embody a glue logic to use the application C 110, the application D 120, or the application E 130. The composite applications A 140 and B 150 may be a primitive application of another composite service.

Each of the applications 110 through 150 may call an API controlling infrastructure network resource through the composite service control system 100, and may call APIs that are provided by other applications 110 through 150. An API call between applications, the call being indicated by a dotted line, is actually transferred to the composite service control system 100 from each applications 110 through 150 through an interface indicated by a solid line, and is routed again to target applications 110 through 150.

Accordingly, the composite service control system 100 is able to monitor all APIs called by the applications. This method may be generally used in a web technology based composite service.

Figure 2:
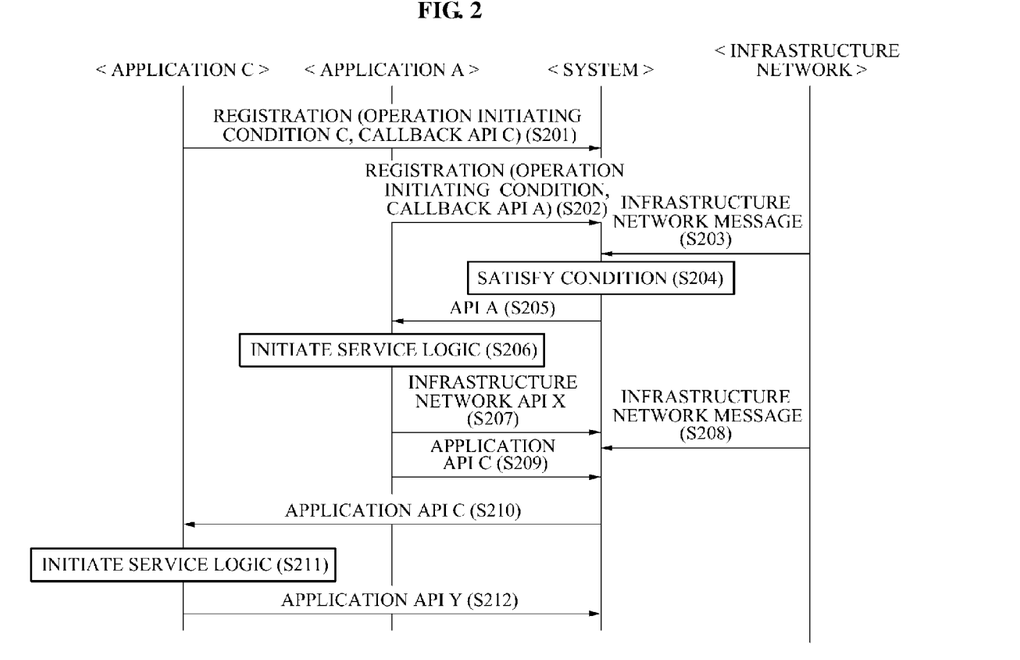
FIG. 2 is a flowchart illustrating a transmission/reception process of a message between a composite service control system and an infrastructure network according to an embodiment of the present invention.

FIG. 2 is a flowchart illustrating a transmission/reception process of a message between a composite service control system and an infrastructure network according to an embodiment of the present invention.

In operations S201 and S202, each of the application C 140 and A 110 may register an application triggering condition and a callback API by calling an API provided by the composite service control system 100. The application triggering condition is a condition that is selected by each application to initiate an operation, and the callback API is an API called when the application triggering condition is satisfied.

In operations S203 and S204, the composite service control system 100 may receive an infrastructure network message 160 and call a registered application by using the registered callback API, when the registered application triggering condition is satisfied.

In operations S205 and S207, the application A 140 may be executed according to a determined service logic and may call one of an infrastructure network API and may call another API.

In general, an application which calls an API may receive a result of an execution as a response message including either 'success' or 'failure' from the composite service control system 100. In a case of the failure, there is a reason for the failure defined by the API, and the application may perform an exception process according to the failure, when a failure response is received from the composite service control system 100. In general, the application may be required to perform a rollback of the entire application, when the failure is a 'failure due to conflict'.

In operation S208, the composite service control system 100 may convert the infrastructure network API call into a protocol message sequence (infrastructure network message).

In operation S209, the application A 140 may call the application C 110 with API C. In operation S210, the composite service control system 100 routes the API C to the application C 110

In operation S211 and S212, the application C 110 is initiated, thereby executing a service logic.

Figure 3:
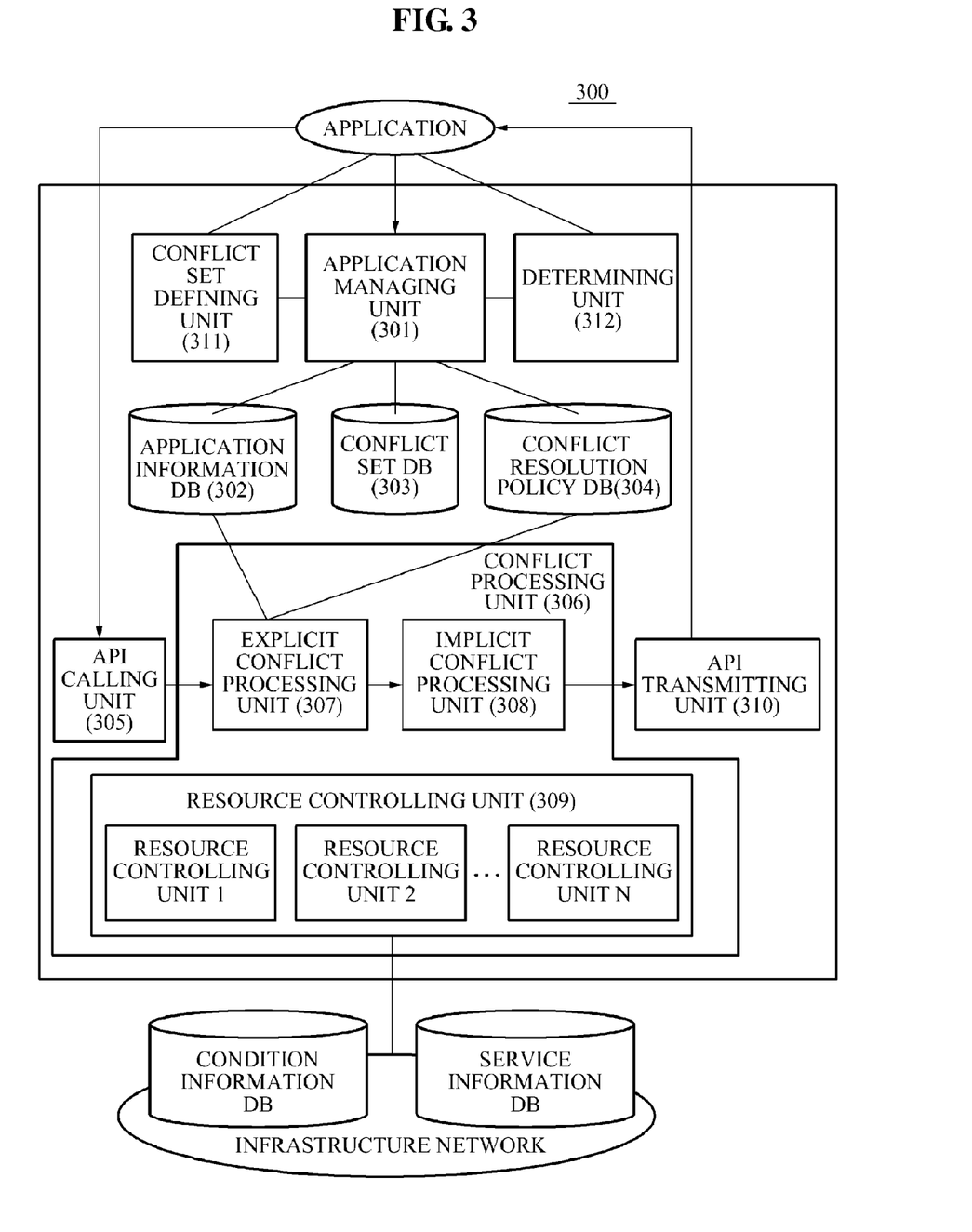
FIG. 3 is a block diagram illustrating a configuration of a composite service control system according to an embodiment of the present invention.

FIG. 3 is a block diagram illustrating a configuration of a composite service control system according to an embodiment of the present invention.

As illustrated in FIG. 3, the composite service control system 300 may include an application managing unit 301, an application information database 302, an conflict set database 303, a conflict resolution policy database 304, an API calling unit 305, a conflict processing unit 306, an explicit conflict processing unit 307, an implicit conflict processing unit 308, a resource controlling unit 309, an API transmitting unit 310, a conflict set defining unit 311, and a determining unit 312.

The conflict set defining unit 311 may define a conflict set with respect to each API, and an explicit conflict set and an implicit conflict set with respect to each application.

The conflict set defining unit 311 may consider mutual exclusion, sequence preservation, and revocability to determine conflict with respect to API.

The mutual exclusion regards that there is a possibility of a conflict (1) when one API is executed and the other API must not be executed, or (2) when an API is allowed to be called by applications one by one.

As an example, a TV is able to display a single content, and thus, when a connection is currently set between the TV and the single content, an additional connection is not able to be set until the current connection is released. Thus, the connection setup API is determined to have a possibility of a conflict with another connection setup API. Moreover, both the call forwarding and the call waiting try to change a called party number of a call, and thus, only one application should be allowed to set a called party number of a call.

The sequence preservation regards that APIs that may cause errors depending on an execution sequence has a possibility of a conflict. That is, the connection setup API and the connection release API are expected to be sequentially executed, and thus, a play, a pause, and a stop can not be executed prior to the connection.

The revocability regard that there is no possibility of a conflict when a single API is revocable without any side effect. Conversely, if two APIs are both irrevocable, there is a possibility of a conflict between the irrevocable APIs.

The conflict with respect to application can be classified an explicit conflict and an implicit conflict. The explicit conflict is predictable prior to execution of the application, since sequence of API call from an application is unconditional once the application is triggered. The implicit conflict can be detected only while the service logic is actually executed since sequence of API call from an application is conditional depending on service logic of an application.

As an example, in a case of a call forwarding and a call waiting, when both services are triggered at the same time, a conflict necessarily occurs. This explicit conflict may be determined when the application registers execution information and an application triggering condition.

However, if a call forwarding and a call waiting is expected to be activated on a condition defined by service logic, although there is a possibility of an conflict between the services, the conflict may be detected while the application is in service since the conflict may not occurs when only one service is activated.

To resolve the two types of conflicts, the conflict set defining unit 311 may define an 'explicit conflict set' which is an set of APIs causing an explicit conflict, and an 'implicit conflict set' which is an set of APIs causing an implicit conflict, with respect to each application.

Accordingly, the conflict set defining unit 311 may define an explicit conflict set and an implicit conflict set of APIs. The 'explicit conflict set' of an API is defined as the conflict set of the API and the 'implicit conflict set' of an API is defined as an empty set.

When a new application requests registration, the conflict set defining unit 311 may define an explicit conflict set and an implicit conflict set of the application. An explicit conflict set for the application is defined as a union of explicit conflict sets of APIs which is unconditionally called by the new application. An implicit conflict set for the application is defined as a union of the explicit conflict set of the application and the implicit conflict sets of the APIs which is conditionally called by the new application.

The defined explicit conflict set and the implicit conflict set are stored in the conflict set database 303.

The application information database 302 may store execution information and application triggering condition with respect to the existing application. The application triggering condition is determined to initiate execution of the existing application, and the execution information is information describing an execution flow of the existing application as a sequence of API calls.

The determining unit 312 may determine an operation initiation condition of a new application that requests an application registration, and, when the determined application triggering condition is overlapped with an operation initiation condition of an existing registered application, may determine both application may cause conflict since they can be triggered at the same time.

The determining unit 312 may determine whether there is an intersection of the explicit conflict sets of the new application and the existing application having overlapping application triggering condition, and determine whether there is an intersection of the implicit conflict set with respect to an API of the new application and an implicit conflict set with respect to an API of the existing application. If an intersection exists, a conflict between the new application and the existing application is explicit, and thus, the new application is required to resolve the expected conflict and can not be registered to the system.

Accordingly, the application managing unit 301 may report the application triggering condition and the execution information with respect to the existing application to the new application as a response for the registration request of the new application. Also, the application managing unit 301 may determine conflict resolution policies through a discussion with a developer of the new application and an infrastructure network operator, may store the determined conflict resolution policies in the conflict resolution policy database 304, and may try the registration again. The conflict resolution policy may be defined identically to all users or may be defined differently for each user.

The new application may change the application triggering condition or the execution information in respect to the modified service logic avoiding the reported conflict, and may transmit again to the composite service control system 300.

The determining unit 312 may accept the registration request of the new application which is expected to cause a conflict with the existing application, when the conflict resolution policy for the expected conflict is stored in the conflict resolution policy database 304.

The determining unit 312 may determine whether the new application is expected not to cause a conflict or there is a defined conflict resolution policy for the expected conflict an intersection of the implicit conflict sets of the new application and the existing application, when no existing application having the overlapping application triggering condition has an intersection of the explicit conflict set the new application or there is a defined conflict resolution policy for the expected conflict.

As a result of the determination, when the intersection of the implicit conflict sets does not exist, the application managing unit 301 may store the execution information and application triggering condition with respect to the new application in the application information database 302.

However, when the intersection of the implicit conflict set with respect to the new application exists, the application managing unit 301 may (1) refuse a registration request of the new application when a conflict resolution policy with respect to an API included in the intersection is not registered, and may (2) register the new application, in the application information database, and the existing application having an intersection with the new application is registered as a member of implicit conflict set for the new application, and the new application is registered as a member of implicit conflict set for the existing application having an intersection with the new application.

Accordingly, the application managing unit 301 may assign a call sequence number in the conflict resolution policy database 304 as the conflict resolution policy with respect to the API.

Thereafter, when the API is called from a plurality of applications, the conflict processing unit 306 may process a conflict of each application based on the conflict resolution policy.

An explicit conflict resolution that is a method for resolving a conflict between applications, is executed at a time when each application is triggered by a callback API based on a registered operation initiation condition. When more than two applications are triggering condition, and the triggered applications call APIs necessarily causing a conflict, the conflict is required to be resolved prior to the conflict.

To prevent the conflict, when an application calls an API or an API resource status is changed, the explicit conflict processing unit 307 may evaluate an application triggering condition of each application and may identify applications satisfying application triggering condition and their registered callback APIs as a candidate callback API set, may compare priorities of the identified callback APIs, may select an callback API having a highest priority, may eliminate the callback APIs that are included in an explicit conflict set of the selected callback API from the candidate callback API set and may trigger the callback APIs remained in the candidate callback API set. Thereafter, the callback APIs belong to the candidate callback API set after elimination and their corresponding applications have no risk of the explicit conflict and can be triggered at the same time.

Also, although applications do not cause a explicit conflict, the applications may have a possibility of an implicit conflict, but the conflict may not necessarily occur. Whether the implicit conflict occurs may only be determined during the execution of the application.

Each application may call an API that control an infrastructure network resource or an API provided by another application based on internally unique service logic. Accordingly, the application may evaluate a value of data defined in a profile of a user, various condition information defined in a profile of the user, and the like, and may follow different execution path based on a result of the evaluation. The application execution path may be defined by four types of combinations, namely, a sequential execution, a conditional execution, a fork execution, a loop execution, in terms of an API called by the application.

Hereinafter, an example where execution information of the application is written in a form of XML will be described with reference to FIG. 4.

Figure 4:
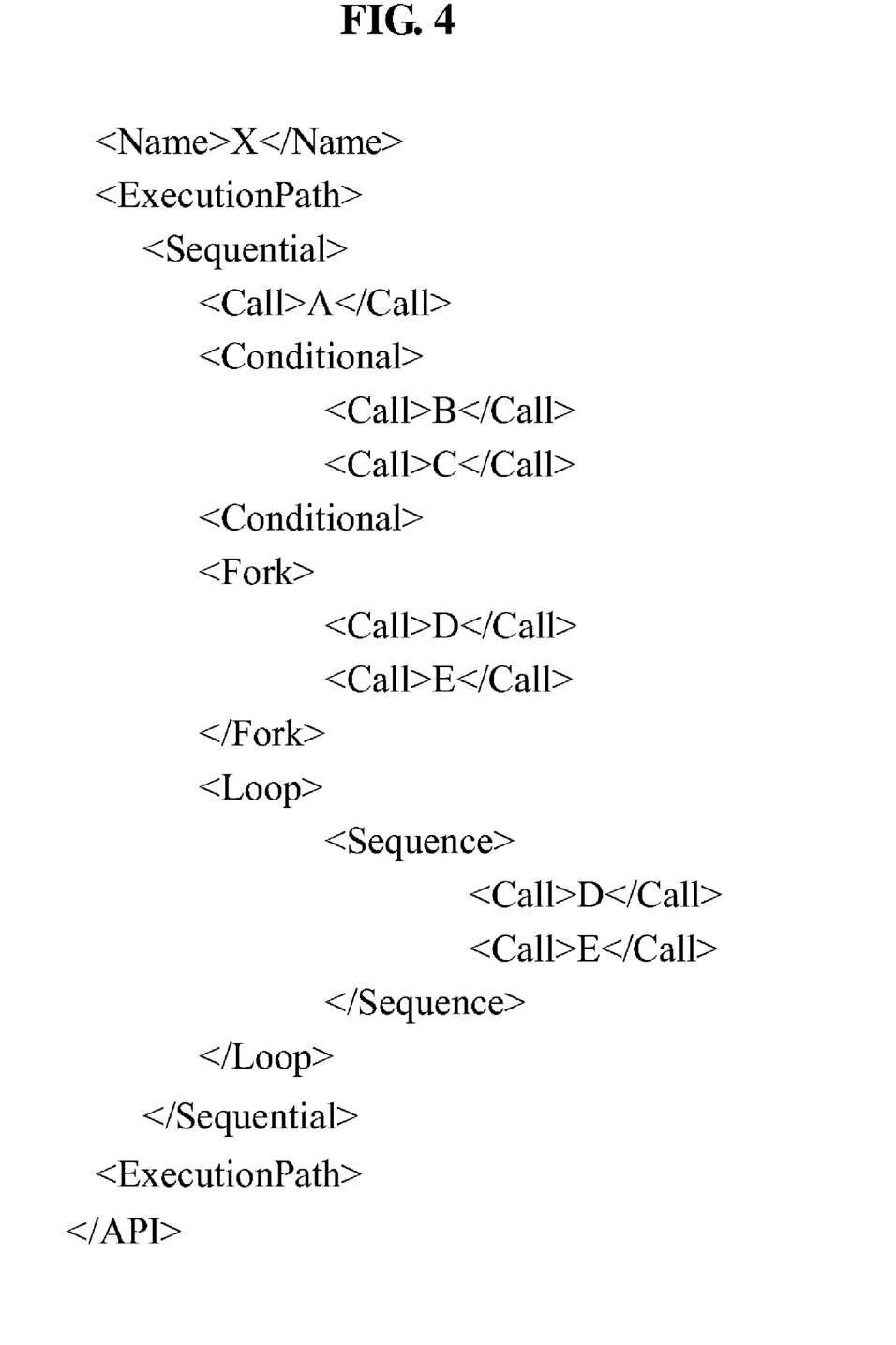
FIG. 4 is a diagram illustrating an example where a composite service control system executes an application according to an embodiment of the present invention.

FIG. 4 is a diagram illustrating an example where a composite service control system executes an application according to an embodiment of the present invention.

As illustrated in FIG. 4, the application provides an API referred to as an X. When the X is called, the application may call a B and a C may depending on a condition after calling an API named as an A. Next, the application simultaneously calls a D and an E, and sequentially and repeatedly executes an F and a G and finishes the execution. The execution information may briefly represent an operation of the application in terms of the API call.

The application may register its execution information in the service control system 300 at a time when the application is deployed in a network. If the application is triggered when satisfying a predetermined condition, the application may registers an operation initiation condition and an callback API with which trigger the application when the condition is satisfied, by using an API provided by the composite service control system 300.

The application may add a call sequence number as a parameter when the application calls an API written in the execution information, while the application is executed. The call sequence number is a serial number based on a sequence of each API arranged in the application execution information, and zero is assigned to a callback API.

As an example, the API X has 0, the A has 1, the B has 2, the C has 3, and the D has 4 in the drawing.

The implicit conflict processing unit 308 may analyze whether each API call obtained from the explicit conflict processing unit 307 is the callback API, and, as a result of the analysis, when the API is the callback API, the implicit conflict processing unit 308 may determine a call sequence number with respect to the callback API, and may generate conflict context information with respect to an application to be triggered by the callback API.

The implicit conflict processing unit 308 may evaluate an implicit conflict candidate set of the called API exists based on the execution information of an application of the API, when the implicit conflict candidate set of the called API does not exist, the implicit conflict processing unit 308 may execute the called API.

However, as the result of the evaluation, when the implicit conflict candidate set of the called API exists, the implicit conflict processing unit 308 checks a call sequence number in the conflict context information of the applications included in the implicit conflict candidate set to determines whether the application that called the API is on the execution path that may cause a conflict. When the called API may cause a conflict, the implicit conflict processing unit 308 may determine a priority of conflicting APIs based on a conflict resolution policy, and may cancel an application that calls an API having a low priority.

Accordingly, the composite service control system 300 may resolve a conflict between APIs called from each application.

Hereinafter, an example where the composite control system 300 resolves a conflict between applications will be described with reference to FIGS. 5 through 7.

Figure 5:
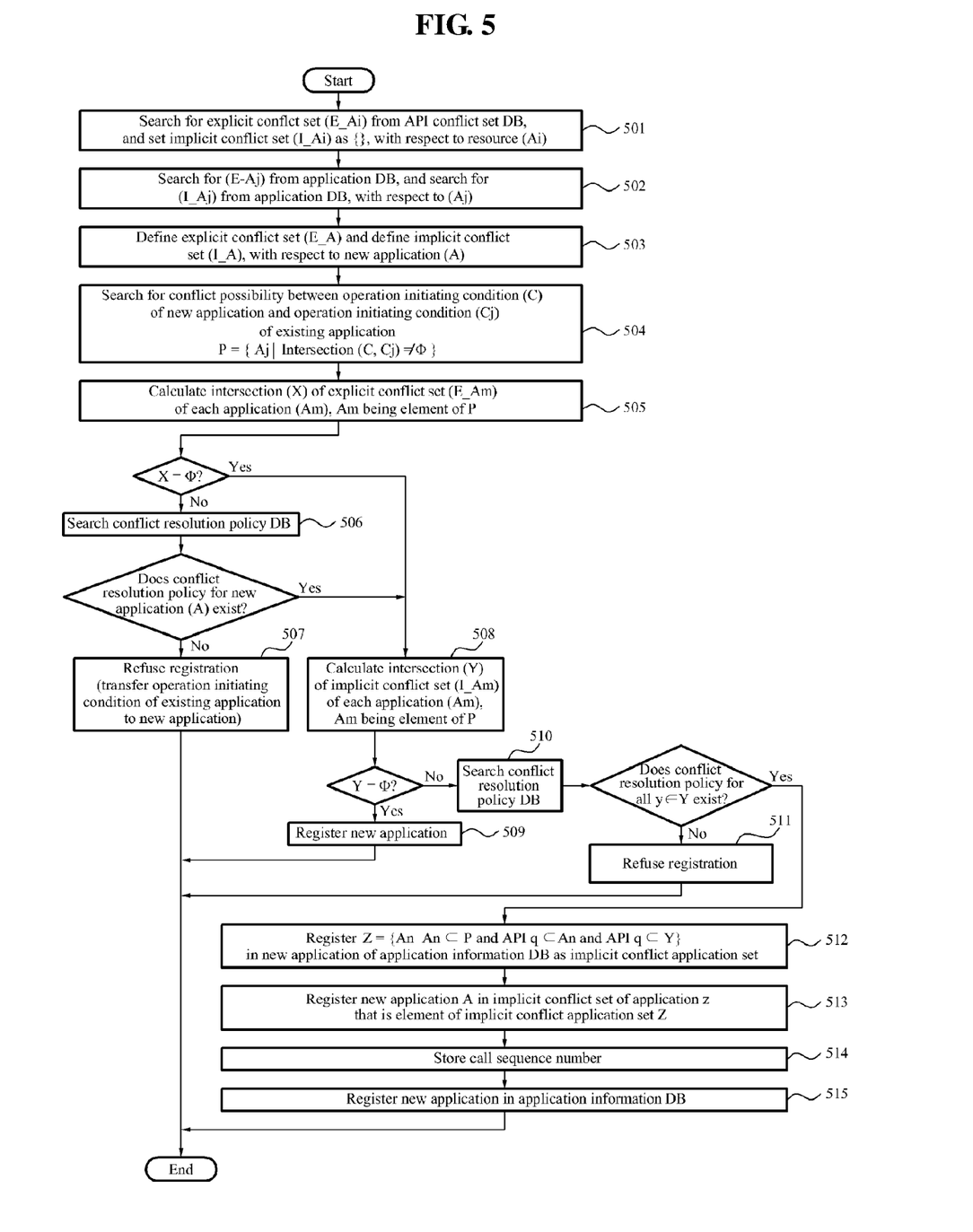
FIG. 5 is a flowchart illustrating an example where a composite service control system resolves a conflict between applications according to an embodiment of the present invention.

FIG. 5 is a flowchart illustrating an example where a composite service control system resolves a conflict between applications according to an embodiment of the present invention.

In operation 501, the conflict set defining unit 311 may define a conflict set with respect to each API provided by an application. In this instance, the conflict set may be classified into an explicit conflict set and an implicit conflict set. Each resource is regarded as a single application. A conflict set of an API with respect to a infrastructure network resource is regarded as the explicit conflict set (E_Ai) and is retrieved from a conflict set database 303, and an implicit conflict set (I_Ai) is regarded as an empty set ({ }).

In operation 502, the conflict set defining unit 311 may search for an explicit conflict set (E_Aj) and an implicit conflict set (I_Aj) with respect to an existing application (Aj) stored in the application information database 302.

In operation 503, the application set defining unit 311 may define an explicit conflict set (E_A) and an implicit conflict set (I_A) with respect to a new application (A).

The explicit conflict set is constituted by a union of explicit conflict sets of all APIs to be unconditionally called the new application is triggered. Conversely, the implicit conflict set is constituted by a union of implicit conflict sets and an explicit conflict possibility sets of APIs to be called by the new application is triggered.

In operation 504, the determining unit 312 determines which application can be activated at the same time. That is, the determining unit 312 may check the application triggering condition of the new application and may find out set of applications having the application triggering condition overlapped with the application triggering condition of the new application.

As an example, when the application triggering condition registered by the new application is a condition C, it is determined that an intersection between the condition C and the application triggering condition Cj of the existing application simultaneously satisfies. That is, when the application triggering condition is simultaneously satisfied, APIs called by the applications initiated based on the condition may be simultaneously called, and thus, there may be a possibility of a conflict. Accordingly, a set P of applications that may be simultaneously triggered may be calculated as follow. P={Aj|Intersection(C, Cj)≠∅}

Accordingly, in operation 505, the determining unit 312 may calculate an intersection (X) of the explicit conflict set (E_Am) of each application (Am) that may be simultaneously triggered with the new application. In this instance, when the calculated intersection X is not an empty set, the determining unit 312 may predict that a conflict necessarily occurs when the two applications simultaneously triggered.

In operation 506, the determining unit 312 may search the conflict resolution policy database 304 to determine whether a conflict resolution policy with respect to the new application is already registered.

When the conflict resolution policy is not registered in the conflict resolution policy database 304, in operation 507, the application managing unit 301 may refuse a registration request of the new application and may report the existing application and the application triggering condition of the existing application in response to the registration request for the new application.

The new application may change the application triggering condition to try registration of the new application in the composite service control system 300 again or may explicitly define, through a discussion with a developer of the new application and an infrastructure network operator, a conflict resolution policy to be performed when the conflict occurs, may store the priority in the conflict resolution policy database, and may try the registration of the new application again.

When the intersection of the explicit conflict set is the empty set or when the conflict resolution policy is registered in the conflict resolution policy database 304, in operation 508, the determining unit 312 may calculate an intersection of the implicit conflict set (I_Am) of each application (Am) that may be simultaneously triggered.

When the intersection of the implicit conflict set is an empty set (Y=Ø), in operation 509, the application managing unit 301 may register the new application in the application information database 302 as an application that does not cause an implicit conflict with existing applications.

However, when the intersection of the implicit conflict set is not the empty set, in operation 510, the application managing unit 301 may search the conflict resolution policy database 304.

In operation 511, the application managing unit 301 may refuse the registration request of the new application when conflict resolution policies are not defined with respect to all APIs included in the intersection of the implicit conflict set.

Conversely, when the conflict resolution policies are defined with respect to the all APIs, in operation 512, the application managing unit 301 may register applications including the APIs included in the intersection of the implicit conflict set as the implicit conflict application set (Z={An|An□P and API q□An and API q□Y}) of the new application.

In operation 513, the application managing unit 301 may register the new application in the implicit conflict application set of each application which is a element in the implicit conflict application set of the new application.

In operations 514 and 515, the application managing unit 301 may register a call sequence number with respect to an API call causing an implicit conflict in the conflict resolution policy database 304 as a conflict resolution policy, to detect an implicit conflict for each application. The conflict resolution policy may be embodied by determining a priority of each application and each API or designating a selection to the user As described above, in an early stage, the conflict set database 303 is organized and the application information database 302 is empty. Subsequently, whenever a new application is registered in the application information database 302, the application managing unit 301 may analyze an explicit conflict occurring due to the new application. As an example, the application managing unit 301 may refuse the registration request when an explicit conflict is predicted due to the registration of the new application or may add a conflict resolution policy in the conflict resolution policy database 304. Also, the application managing unit 301 may register the new application in the application information database 302 and analyze an implicit conflict, when the explicit conflict is not predicted or the conflict resolution policy is stored in advance. Accordingly, the application managing unit 301 may store a result of the analysis in the application information database 302 and repeatedly perform the described series of operations whenever a new application is added, thereby collecting application information with respect to entire applications.

Figure 6:
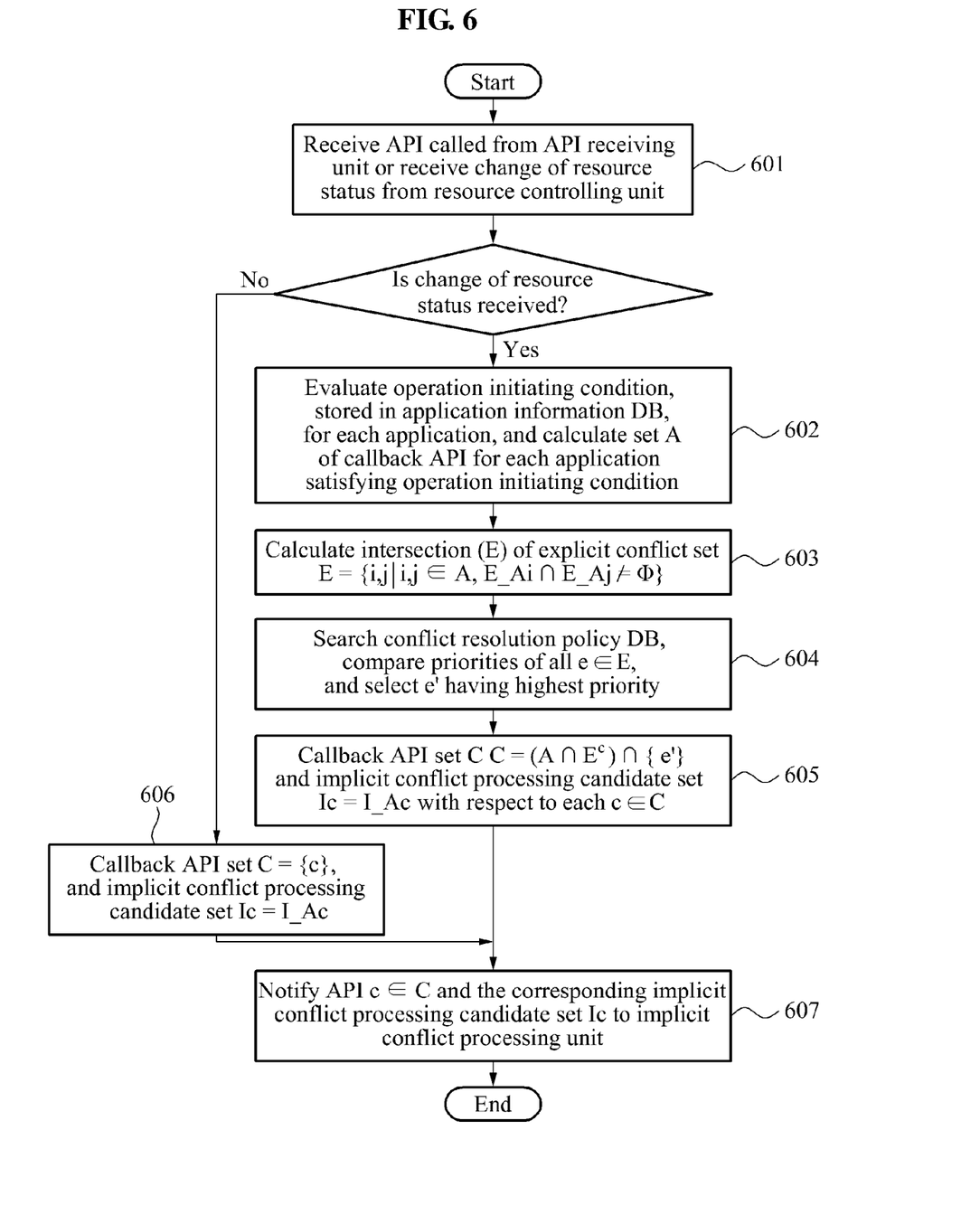
FIG. 6 is a flowchart illustrating an example where a composite service control system processes an explicit conflict according to an embodiment of the present invention.

FIG. 6 is a flowchart illustrating an example where a composite service control system processes an explicit conflict according to an embodiment of the present invention The API calling unit 305 may receive an API call from an application, and when the API call is an infrastructure network resource API call, the API calling unit 305 may invoke a resource controlling unit 309, and the resource controlling unit 309 may call a controlling unit of a corresponding resource, thereby controlling the resource for each API. As a result of the controlling, when a status of the resource is changed, the resource controlling unit 309 may notify the resource status change to the explicit conflict processing unit 307, and when the resource is an API with respect to another application, it directly is transferred from the API calling unit 305 to the explicit conflict processing unit 307 without invoking the resource controlling unit 309.

In operation 601, the explicit conflict processing unit 307 may be informed of a resource status change from the resource controlling unit 309 or may be informed of an API call from the API calling unit 305, for determination with respect to an application triggering condition of the application.

In operation 602, when the resource status change is received, the explicit conflict processing unit 307 may evaluate an application triggering condition for each application, the application triggering condition being stored in the application information database 302, thereby identifying a callback API satisfying the application triggering condition for each application.

In operation 603, the explicit conflict processing unit 307 may calculate an explicit conflict set (E={i,j|i,j□A, E_Ai∩E_Aj≠Ø}) of callback APIs.

In operation 604, the explicit conflict processing unit 307 may compare priorities of APIs (e□E) included in the explicit conflict set based on priorities stored in the conflict resolution policy database 304, and may select one of API (e') having a highest priority.

In operation 605, the explicit conflict processing unit 307 may eliminate APIs included in the explicit conflict set of the selected API among callback APIs satisfying a plurality of application triggering condition and may define a set of remaining callback APIs as a implicit conflict candidate set (C=(A∩E$^c$)□{e'}).

The explicit conflict processing unit 307 may define an implicit conflict set stored in the application information database 302 as an implicit conflict processing candidate set, with respect to each API included in the callback API set. Accordingly, the explicit conflict processing unit 307 may obtain callback APIs where an explicit conflict is eliminated, with respect to callback APIs to be called due to the resource status change.

In operation 606, when the application calls an API, the explicit conflict processing unit 307 may construct a callback API set with only the called API, and may define an implicit conflict set of the called API as an implicit conflict processing candidate set (Ic).

Subsequently, in operation 607, the explicit conflict processing unit 307 may notify each API included in the callback API set and the corresponding implicit conflict processing candidate set (Ic) to the implicit conflict processing unit 308.

Figure 7:
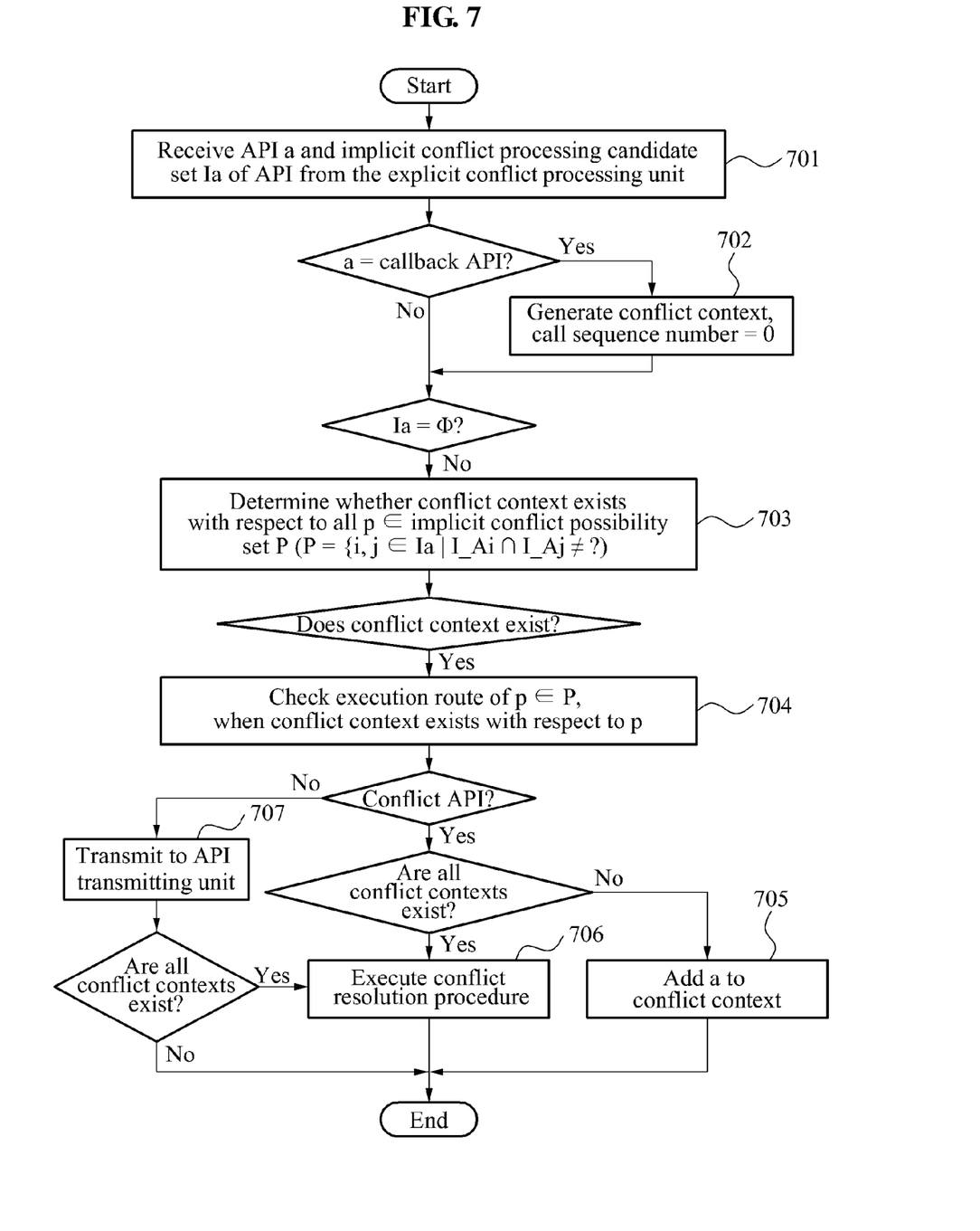
FIG. 7 is a flowchart illustrating an example where a composite service control system processes an implicit conflict according to an embodiment of the present invention.

FIG. 7 is a flowchart illustrating an example where a composite service control system processes an implicit conflict according to an embodiment of the present invention.

The implicit conflict processing unit 308 may process an implicit conflict with respect to APIs where an explicit conflict is excluded, the APIs being received from the explicit conflict processing unit 307. To process the implicit conflict, the implicit conflict processing unit 308 may analyze execution information of an application stored in the application information database 302 with respect to the APIs, may analyze the received APIs to trace an execution path of each application, and may internally manage a call sequence number of an API that is finally executed in each application as a conflict context.

In operation 701, the implicit conflict processing unit 308 may receive an API (API a) and an implicit conflict processing candidate set (Ia) of the API from the explicit conflict processing unit 307, and may search the application information database 302 to determine whether the received API is a callback API for initiation of an application.

When the receive API is the callback API, in operation 702, the implicit conflict processing unit 308 may generate a conflict context with respect to the corresponding application, and may write the call sequence number as '0' to indicate that the callback API is called in the conflict context.

In operation 703, when an implicit conflict possibility set ($P=\{i,j \Box Ia | I\_Ai \cap I\_Aj \neq \emptyset\}$) of the received API call is an empty set (Ia=Ø), the implicit conflict processing unit 308 may transfer the received API call to the API transmitting unit 310 since the call has no possibility of a conflict. However, when the implicit conflict processing candidate set is not the empty set, the implicit conflict processing unit 308 may determine whether a conflict context exists with respect to an application included in the implicit conflict processing candidate set to determine whether the possibility of the conflict with respect to the received API call is resolved. Here, existence of the conflict context indicates that another application that may cause a conflict is currently executing.

Accordingly, in operation 704, the implicit conflict processing unit 308 may check an execution path to determine whether the other application having the conflict context and being included in the implicit conflict possibility set is on a execution path where a conflict may occurs. Whether the application is on the execution path where a conflict may occur may be determined by analyzing the call sequence number written in the conflict context based on the execution information of the application stored in the application information database 302.

Whether the current API is an API causing a conflict is determined through the described execution path analysis. When the API is the API causing the conflict, it is required that all conflict contexts included in the implicit conflict possibility set already exist, and all conflict contexts included in the implicit conflict possibility set say each application is out of execution path that may cause conflict.

As described above, when the receive API may cause conflict and all the conflict contexts does not exist, the implicit conflict processing unit 308 may record the receive API to a conflict context of a corresponding application, and may wait until the conflict contexts are all determined.

In operation 706, the implicit conflict processing unit 308 may perform a conflict resolution procedure after all the conflict contexts are determined. The conflict resolution procedure may determine priorities of APIs causing a conflict based on the conflict resolution policy database 304, and may cancel an application with respect to an API having a low priority by responding a response having a reason for failure of a 'failure due to a conflict'. In this instance, the implicit conflict processing unit 308 may delete a conflict context of the canceled application.

In operation 707, the implicit conflict processing unit 308 may transfer the received API to the API transmitting unit 310, when the received API is not the API that may cause conflict.

Although the receive API does not cause conflict, when the conflict contexts of the applications are all determined owing to the received API, the implicit conflict processing unit 308 may proceed with operation 706 to perform the conflict resolution procedure.

The implicit conflict processing unit 308 may update a call sequence number of the conflict context with a call sequence number of the received API with respect to the API transferred to the API transmitting unit 310, thereby consistently maintaining the conflict context. The API transmitting unit 310 may transfer the received API to the application.

Through the described procedure, the implicit conflict processing unit 308 may monitor, in real time, the execution path of the application that is currently execute, and thus, a conflict resolution may be executed when the implicit conflict actually occurs.

The method according to the above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A composite service control system resolving a conflict, the system comprising:
  a processor;
  a conflict set defining unit to classify operable on the processor and define an conflict set with respect to an application programming interface (API) that is called from each application, and define an explicit conflict set and an implicit conflict set with respect to an application;

a determining unit to determine an application triggering condition of a new application that requests an application registration, and, when the determined application triggering condition is overlapped with an application triggering condition of an existing registered application, to determine whether an intersection between an explicit conflict set of the new application and an explicit conflict set of the existing application exists and whether an intersection between an implicit conflict set with respect to an API of the new application and an implicit conflict set with respect to an API of the existing application exists; and an application managing unit to report the application triggering condition and execution information of the existing application and to request a defining of a conflict resolution policy or a changed application triggering condition for the new application, when either of the intersections exist, and to store the application triggering condition and the execution information of the new application in an application information database, when the intersections do not exist or the conflict resolution policy has been defined, wherein the conflict set defining unit defines a conflict set for an API, one of a mutual exclusion, a sequence preservation, and a revocability is considered as a conflict occurrence condition.

2. The system of claim 1, wherein the conflict set defining unit determines an explicit conflict set and an implicit conflict set for an application, a conflict set of APIs that is unconditionally executed is defined as the explicit conflict set for each application; and a conflict set of APIs that is conditionally executed is defined as the implicit conflict set for each application.

3. The system of claim 1, further comprising: an explicit conflict processing unit, when an API call is received from an application or an API resource status is changed, determines an application triggering condition of each application and identifies callback APIs satisfying the condition, compares priorities of conflict resolution policies related to explicit conflict sets of the identified callback APIs, selects an callback API having a highest priority, eliminates the callback APIs that are included in an explicit conflict set of the selected callback API from the set of the identified callback APIs, and trigger the callback APIs remained after elimination.

4. The system of claim 1, further comprising: an implicit conflict processing unit analyzes whether each API call obtained by the explicit conflict processing unit is a callback API, and when each API is the callback API, determines a call sequence number for the callback API, and generates conflict context information with respect to an application to be triggered by the callback API.

5. The system of claim 4, wherein the implicit conflict processing unit determines whether to execute or cancel an API in the implicit conflict set according to a conflict resolution policy when the API is called, an implicit conflict candidate set of the called API does not exists, executes the called API.

6. The system of claim 5, wherein, when the implicit conflict candidate set of the called API exists, the implicit conflict processing unit checks a call sequence number in a conflict context information of an application included in the implicit conflict candidate set and determines whether the application that called that API is on an execution path that may cause a conflict.

7. The system of claim 6, wherein, when the application is on the execution path that may cause a conflict, the implicit conflict processing unit determines priorities of conflicting APIs according to the conflict resolution policy, and cancels an application that calls an API having low priority.

* * * * *